US005247376A

United States Patent [19]

Wakai

[11] Patent Number: 5,247,376

[45] Date of Patent: Sep. 21, 1993

[54] METHOD OF DRIVING A LIQUID CRYSTAL DISPLAY DEVICE

[75] Inventor: Yoichi Wakai, Suwa, Japan

[73] Assignee: Seiko Epson Corporation, Tokyo, Japan

[21] Appl. No.: 433,925

[22] Filed: Nov. 9, 1989

[30] Foreign Application Priority Data

Nov. 17, 1988 [JP] Japan ................................ 63-290603

[51] Int. Cl.[5] ................................................ G02F 1/13

[52] U.S. Cl. ......................................... 359/55; 359/54; 345/95; 345/210

[58] Field of Search ............................... 350/333, 334; 340/784 D, 805; 359/54, 56, 55

[56] References Cited

U.S. PATENT DOCUMENTS

| | | | |
|---|---|---|---|
| 3,938,136 | 2/1976 | Kawakami | 340/784 |
| 3,995,942 | 12/1976 | Kawakami et al. | 340/784 |
| 4,404,555 | 9/1983 | Long et al. | 340/784 |
| 4,560,982 | 12/1985 | Sonehara et al. | 340/784 |
| 4,743,096 | 5/1988 | Wakai | 350/333 |
| 4,857,906 | 8/1989 | Conner | 340/805 |
| 4,870,398 | 9/1989 | Bos | 340/784 |
| 4,906,984 | 3/1990 | Takeda et al. | 340/784 |
| 4,915,477 | 4/1990 | Ohta et al. | 340/784 |
| 4,925,277 | 5/1990 | Inaba | 350/333 |
| 4,929,058 | 5/1990 | Numao | 350/333 |
| 4,930,875 | 6/1990 | Inoue et al. | 350/333 |
| 4,945,352 | 7/1990 | Ejiri | 350/333 |
| 4,990,905 | 2/1991 | Kuijk | 340/805 |
| 5,010,328 | 4/1991 | Morris et al. | 340/805 |
| 5,011,269 | 4/1991 | Wakita et al. | 340/784 |
| 5,011,327 | 4/1991 | Wakita et al. | 340/784 |

FOREIGN PATENT DOCUMENTS

| | | | |
|---|---|---|---|
| 54-121097 | 9/1979 | Japan | 340/784 |
| 59-934424 | 5/1984 | Japan | 350/334 |
| 60-150032 | 8/1985 | Japan | 350/333 |
| 62-85226 | 4/1987 | Japan | 350/333 |
| 62-161129 | 7/1987 | Japan | 340/784 |
| 63-92930 | 4/1988 | Japan | 350/333 |
| 63-220117 | 9/1988 | Japan | 304/784 |
| 2-3088 | 1/1990 | Japan | 340/784 |
| 2-126222 | 5/1990 | Japan | 340/784 |

OTHER PUBLICATIONS

Niwa, et al. "LCTV Addressed by MIM Devises", *SID 84 Digest*, 18.1, pp. 304–307 (1984).

Morozumi, et al., "A 250×240 Element LCD Addressed by Lateral MIM", *Japan Display '83*, 10.3, pp. 404–407, 1983.

*Primary Examiner*—William Mintel
*Assistant Examiner*—Minhloan Tran
*Attorney, Agent, or Firm*—Blum Kaplan

[57] ABSTRACT

A method of activating a matrix liquid crystal display formed with column electrodes intersecting row electrodes and liquid crystal material therebetween in which liquid crystal pixels are defined at the intersections of the row and column electrodes. The column electrodes are provided with voltage waveforms of high and low magnitude corresponding to display data. The row electrodes are supplied with a sequential scanning signal of activating magnitude. During one data output period, a signal for the data about the selected rows is delivered with one polarity and then switches to the opposite polarity N number of times (where N is a positive integer) during the same data output period to prevent crosstalk in the column electrodes.

43 Claims, 6 Drawing Sheets

FIG. 6(A)
PRIOR ART
FIG. 6(B)
PRIOR ART
FIG. 6(C)
PRIOR ART
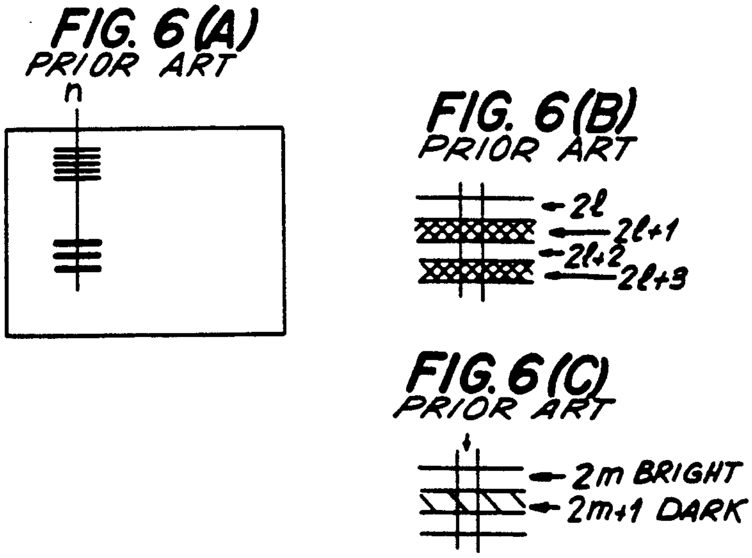
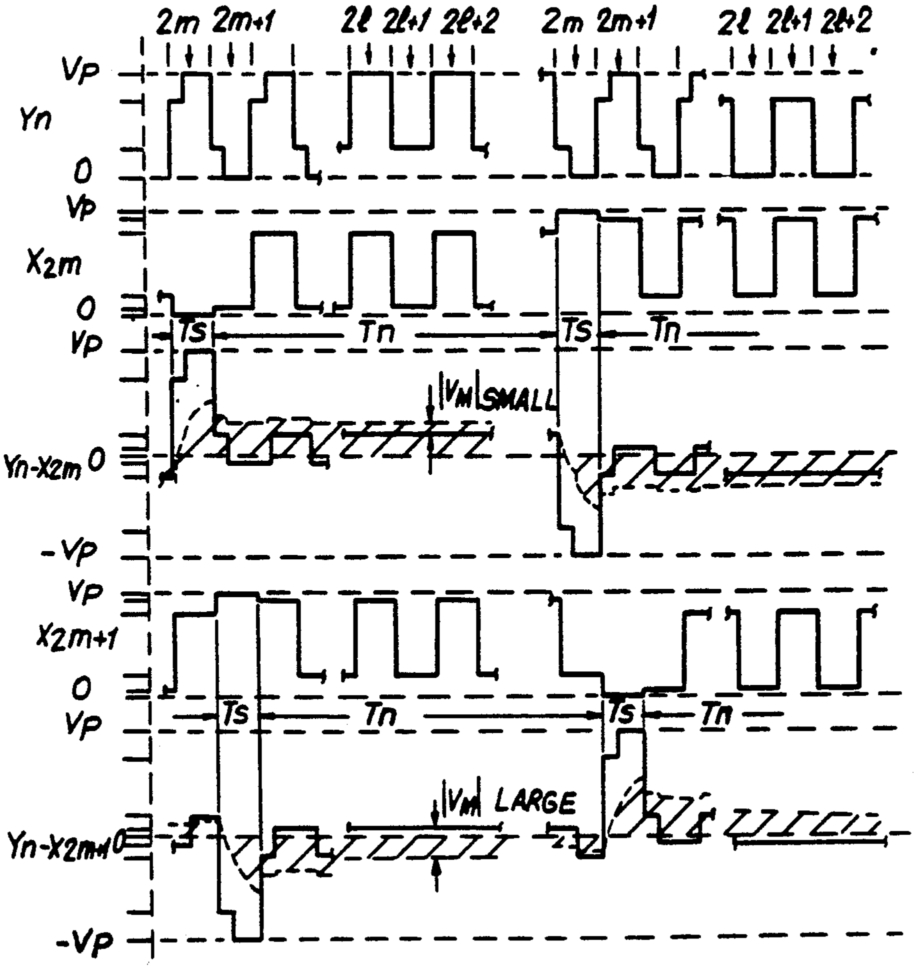
FIG. 7
PRIOR ART

METHOD OF DRIVING A LIQUID CRYSTAL DISPLAY DEVICE

BACKGROUND OF THE INVENTION

This invention relates generally to a method of activating a liquid crystal display and, in particular, to a display activation method which eliminates crosstalk occurring between adjacent column elements in a liquid crystal display.

Conventional liquid crystal displays include a matrix of liquid crystal display elements. Some conventional displays are classified as passive matrix displays and are activated with high duty cycles and time-division multiplexing. Other conventional displays are classified as active matrix displays and each liquid crystal element, or pixel, includes a switching element having storage capabilities. Active matrix liquid crystal displays employing two terminals, separated by a non-linearly conducting material such as a metal-insulator-metal (MIM) device, require relatively simple manufacturing processes and provide high contrast. A driving circuit for a liquid crystal electro-optical device is described in U.S. Pat. No. 4,560,982, the contents of which are hereby incorporated herein by reference.

A simplified configuration of a MIM active matrix liquid crystal display is shown as a display 200 in FIG. 2(A). An A/D converter 201 of display 200 converts an incoming analog video signal into 4-bits of digital video data ($D_0$–$D_3$). The 4-bits of video data $D_0$–$D_3$ are supplied to a Y driver 202 which produces a data signal to a plurality of column electrodes 205 of a liquid crystal panel 204. Liquid crystal panel 204 is in the form of a sheet having orthogonal electrodes arranged in rows and columns. A plurality of row electrodes 206 of panel 204 for supplying scanning signals are driven by an X driver 203.

A timing controller provides a plurality of timing signals DY, YCL, LP, FR and FGS to Y driver 202. Y driver 202 also receives voltages $V_0$, $V_3$, $V_4$ and $V_7$ for activating the liquid crystal display.

X driver 203 produces a scanning signal to row electrodes 206 of liquid crystal panel 204. X driver 203 is activated by timing signals DX, XCL and FR from the timing controller. X driver 203 also receives voltages $V_0$, $V_1$, $V_2$, $V_5$ and $V_6$ for activating the liquid crystal material. The activating voltages decrease sequentially from $V_0$ to $V_7$.

A portion of panel 200, including row electrode 206, column electrode 205, a layer of liquid crystal material 207 and a MIM device 208, is shown in FIG. 2(B). Liquid crystal layer 207 and MIM device 208 are connected in series at each intersection of column electrodes 205 and row electrodes 206. One end of liquid crystal layer 207 is electrically coupled to row electrode 206 and one end of MIM device 208 is electrically coupled to column electrode 205. The current-voltage characteristics of MIM device 208 are shown in FIG. 4. The potential across liquid crystal layer 207 is denoted VLC and the potential across MIM 208 is denoted VM.

FIG. 3 is a circuit diagram for Y driver 202. Y driver 202 includes a plurality of output circuits for energizing column electrodes 205. Each output circuit is identical in configuration to the output circuit for energizing a first output Y0 of a line buffer 302.

A shift register 301 successively delivers shift data signals or start signals to each successive line buffer 302 in response to a shift clock pulse YCL. Buffer 302 includes a plurality of 4-bit memories, such as MOA's of a first line buffer 303. When shift register 301 delivers a shift signal, video data bits $D_0$–$D_3$ are successively stored in the memories and video data about one line is thereby stored.

A second line buffer 304 includes a plurality of 4-bit memories such as MOB's. Video data are transferred from first line buffer 303 to second line buffer 304 in response to latch pulse LP. In this manner, video data $D_0$–$D_3$, which are initially sent serially, are converted into parallel form by second line buffer 304.

The video data from second line buffer 304 are inverted by a plurality of inverters 305 and transmitted to a coincidence circuit 307. The other 4-bit input terminals of coincidence circuit 307 receive 4-bit logic data $Q_0$–$Q_3$ from a 4-bit counter 306 which can be a 4-bit binary counter. Counter 306 is reset by signal RES and counts clock pulses FGS which are provided for producing various grey levels.

When coincidence circuit 307 detects the coincidence of inverted data from second line buffer 304 and logic data from 4-bit counter 306, coincidence circuit 307 sets an SR latch 308 by providing a signal to the S input of latch 308. Latch 308 is reset by signal RES which is input to the R input terminal of latch 308. When Y driver 202 is activated in a conventional manner, signal LP is applied to Y driver 202 at both the LP and RES input terminals of Y driver 202 such that the signals were not independent.

As shown in the timing diagram of FIG. 5, fifteen (15) FGS pulses occur within one LP (RES) time period. When signal LP (RES) is applied to SR latch 308, latch 308 takes a logic level of 0. If the inverted data from second line buffer 308 agrees with the logic data from 4-bit counter 306, SR latch 308 assumes a logic value of 1. The period of signal LP corresponds to one data output period and SR latch 308 is maintained at logic 1 during a period given by:

$$\text{one data output period} \times \frac{MOB\text{'s codes}}{15}$$

Terminals Q and $\overline{Q}$ of SR latch 308 are electrically coupled to the gate terminals of analog switches 309 and 310 respectively. Signals FR and $\overline{FR}$ are input to analog switches 311 and 312, respectively. Voltages $V_0$ and $V_7$ are applied to switches 311 and 312, respectively. To activate liquid crystal material 207, either voltage $V_0$ or $V_7$ is applied to the source terminal of analog switch 310 via switch 314 or switch 313. The drain terminals of analog switches 309 and 310 are connected together and deliver column electrode driving output Y0.

Y driver circuit 202 produces Y signal waveforms as shown in FIG. 5. Voltages $V_0$–$V_7$ assume values as follows:

$$V_0 = Vp$$

$$V_3 = Vp - Va$$

$$V_4 = Va$$

$$V_7 = 0$$

The polarity of the Y signal is inverted every data output period, equal to period Ts. The phase is inverted every successive field which is equal to Ts+Tn. A first field is equal to Ts1+Tn1 and a second field is equal to Ts2+Tn2, etc. Both the ratio of the activating ON voltages Vp and (0) to the non-activating OFF voltages Vp−Va and (Va) is determined during one data output period, depending on the contents of video data $D_0$–$D_3$. Accordingly, the output is pulse width-modulated to provide selected grey levels.

X driver 203 receives either shift data signal DX or a start signal and shift data successively in response to shift clock pulses of signal SCL. The particular column electrode 206 corresponding to the position to which data has been transferred receives the following signal as the scanning signal:

at a selected period, either voltage $V_0$ or $V_1$; and during every unselected period, a first voltage level of $V_1$ and $V_5$ or a second voltage level of $V_2$ and $V_6$.

Voltages $V_1$–$V_6$, shown in FIG. 5, assume values given by:

$$V_1 = Vp - Vb$$

$$V_2 = Vp - Va + Vb$$

$$V_5 = Va - Vb$$

$$V_6 = Vb$$

The voltage level assumed during a selected period and the voltage level during an unselected period are alternating signals, synchronized with signal FR. During a selected period, the voltage level is in phase with signal FR. During an unselected period, the voltage level is 180° out of phase with signal FR.

For the X signal shown in FIG. 5, voltage $V_0$ becomes equal to Vp ($V_0 = V_p$) during selected period $Ts_1$. The first voltage level is then selected during unselected period $Tn_1$. After the voltage $V_7$ becomes null ($V_7 = 0$) during selected period $Ts_2$, the second voltage level is selected during unselected period $Tn_2$.

Signal Y-X, shown in FIG. 5, shows variations of the potential at Y electrode 205 with respect to the potential at X electrode 206. The illustrated broken lines indicate the potential at a point located midway between MIM device 208 and liquid crystal display 207, as shown in FIG. 2(B). The hatched portion indicates the effective voltage VLC applied to the liquid crystal. The difference between the Y-X signal and the level represented by the broken line indicates voltage VM applied to MIM device 208.

During selected period $Ts_1$ or $Ts_2$, the magnitude of |Y-X| is large, as shown in the third and first quadrants of the IM-VM characteristic curve of MIM device 208 (FIG. 4); |VM| is large, therefore |IM| is also large. Accordingly, electric charge is stored in the liquid crystal 207, resulting in a large value of |VLC|. The magnitude of |VLC| is determined both by the ratio of potential Va (Vp-Va) and potential 0 (Vp) on the application of Y signal during period $Ts_1$ or $Ts_2$. As the percentage of 0 (Vp) increases, |VLC| increases.

During unselected periods $Tn_1$ and $Tn_2$, the Y-X signal assumes levels Vb(Va−Vb) and (Va−Vb)(−Vb), respectively. Therefore, in the first and third quadrants of FIG. 4, |VM| takes smaller values than during selected periods $TS_1$ and $TS_2$. Electric current IM and electric discharge from liquid crystal 207 through MIM device 208 are also small. Accordingly, during unselected periods $Tn_1$ and $Tn_2$, electric charge is retained. Liquid crystal device 200 is activated almost statically. Hence, a liquid crystal display offering high contrast can be realized.

This conventional activation method has certain drawbacks. FIGS. 6(A), 6(B) and 6(C) depict one example of display provided by a liquid crystal. From row electrode 21 to row (2l+3), the even rows are on, and none of the odd rows are on as shown in FIG. 6(B). The other rows, row 2m and row (2m+1) of column n provide a display of another pattern (e.g. half tone pattern). It is noted that the video data to be displayed in both pixels (2m, n) and (2m+1, n) are the same as shown in FIG. 6(C). Although both display the same video data pixel (2m, n) appears bright, pixel (2m+1, n) appears dark. This phenomenon is caused by crosstalk between the successive rows, beginning from row 21 and ending with row 2l+3. The cause of this crosstalk interference is described below.

FIG. 7 shows output Yn from Y driver 202 and outputs X2m and (X2m+1) from X driver 203. Voltages Yn-X2m and Yn-X2m+1 are applied to pixels (2m, n) and (2m+1, n), respectively.

During selected period Ts, |VLC| of the liquid crystal having pixel (2m, n) is large due to pulse width modulation driving. However, during retention period Tn, |VM| is small. For this reason, electric charge is retained. During selected period Ts, when rows beginning with row 2l and end with (2l+2) are selected, Yn-X2m remains constant, having a voltage of Va−Vb or −(Va−Vb). This occurs because Yn shifts toward Vp during this selected period. Because row 21 is lit up, video data bits take logic values of 1, 1, 1, 1 and the voltage is Vp. Row (2l+1) is not lit up, i.e., video data bits take on logic values of 0, 0, 0, 0 and the voltage is Va. Consequently, |VM| is relatively small. Thus, electric discharge through MIM device 208 is small.

For pixel (2m+1, n), during unselected period Tn, when rows beginning with row 21 and ending with row 21+2 are selected, Yn-X2m+1 remains at a voltage of Vb or −Vb. Therefore, |VM| is comparatively large and the amount of electric discharge through MIM device 208 is large.

Although the video data at pixels (2m, n) and (2m+1, n) are common, the effective voltage applied to pixel (2m, n) on the liquid crystal, proportional to the area of the hatched portion is larger than the effective voltage applied to pixel (2m+1, n). Therefore, the two pixels differ in brightness, although the same signal is applied to both pixels in a selected time period.

The signal activating the liquid crystal display 200 is inverted at every line. Consequently, if the driving voltage is inverted every M rows, the pattern of either lit up dots or dots that are not lit up in each M rows appears as crosstalk between the pixels of the same column included in the pattern. Conventional liquid crystal activating methods therefore have inadequacies due to these shortcomings.

Accordingly, it is desirable to provide an improved method of activating a liquid crystal display which avoids the shortcomings of the prior art and provides a clear uniform display that lacks localized contrast variations caused by crosstalk.

SUMMARY OF THE INVENTION

Generally speaking, in accordance with the present invention, a method of activating a liquid crystal matrix panel formed with row electrodes for supplying a scanning signal and column electrodes for supplying a data signal and having liquid crystal material therebetween is provided. A selected row electrode is supplied with a signal which switches polarity at least once during a single data output period. The signal can switch from high to low or low to high. During one data output period, a signal for the data about a selected row is delivered with a first polarity and then the same signal is delivered with an opposite polarity. The switching occurs N times where N is a positive integer. The signal can be delivered with a first positive polarity or a first negative polarity and then switch to the other. This prevents crosstalk from occurring within a column.

In a preferred embodiment, N=1.

Accordingly, it is an object of the invention to provide an improved method for activating a liquid crystal display.

Another object of the invention is to provide a method of activating a liquid crystal display without producing crosstalk between pixels electrically coupled to the same column electrode.

A further object of the invention is to provide an improved circuit for driving a liquid crystal display in which crosstalk noise is substantially eliminated within a column electrode.

Still other objects and advantages of the invention will in part be obvious and will in part be apparent from the specification and drawings.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6(A) is a schematic plan view of a pattern shown on a liquid crystal display;

FIG. 6(B) is a plan view of electrodes for activating a liquid crystal display;

FIG. 6(C) is a schematic plan view of row electrodes for activating a liquid crystal display;

FIG. 7 is a waveform diagram of signals for activating a liquid crystal display element.

DETAILED DESCRIPTION OF THE PREFERRED EMBODIMENTS

Figure 1:
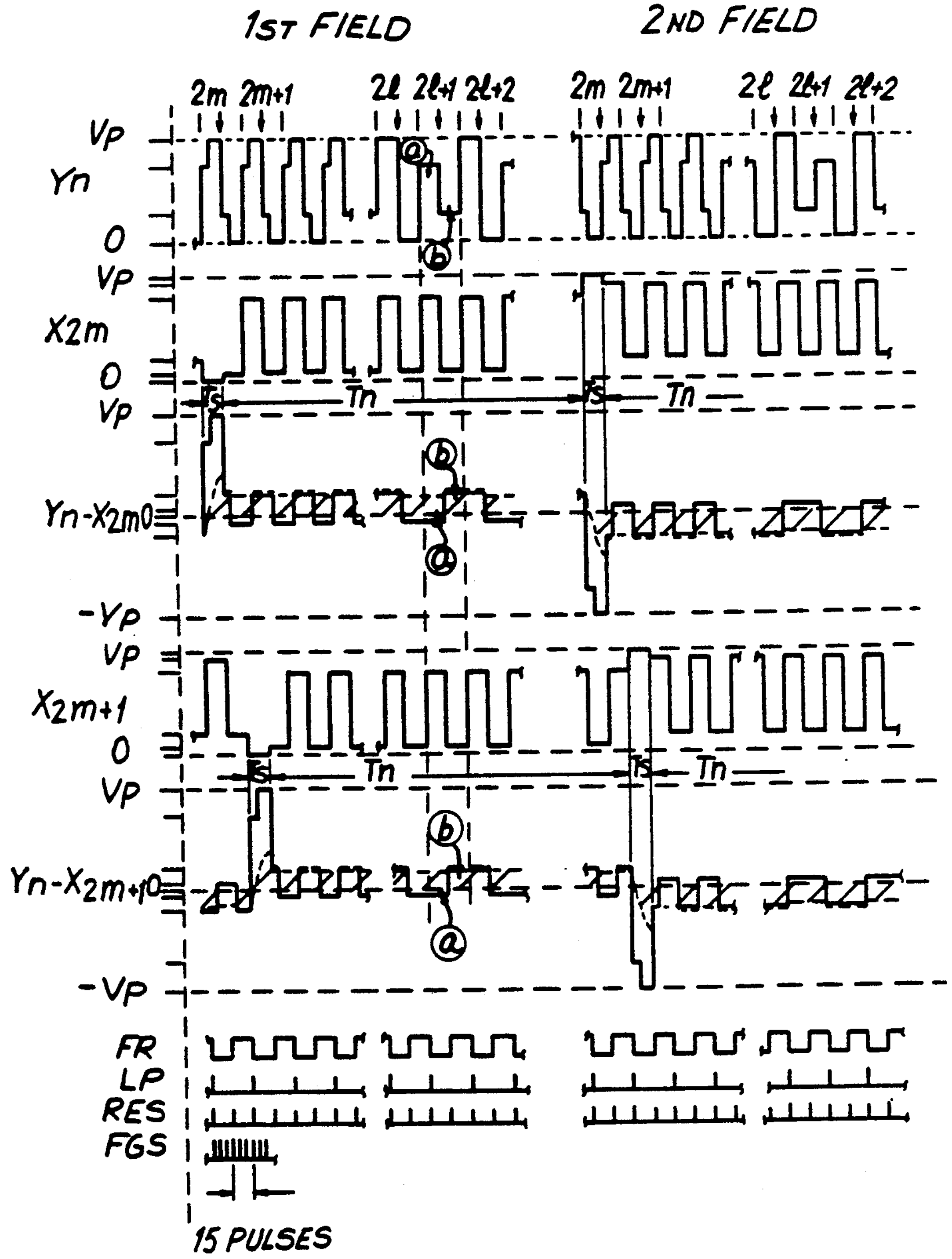
FIG. 1 is a waveform diagram of signals for activating a liquid crystal display in accordance with the invention.
Figure 2A:
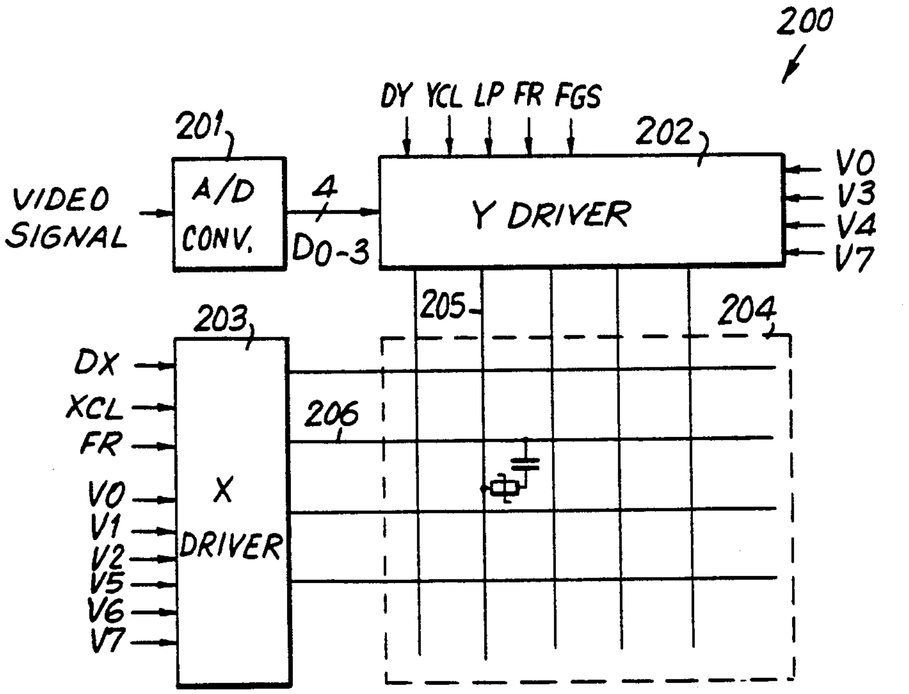
FIG. 2(A) is a circuit diagram of an active matrix liquid crystal display.
Figure 2B:
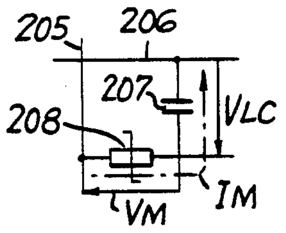
FIG. 2(B) is an enlarged portion of FIG. 2(B)
Figure 4:
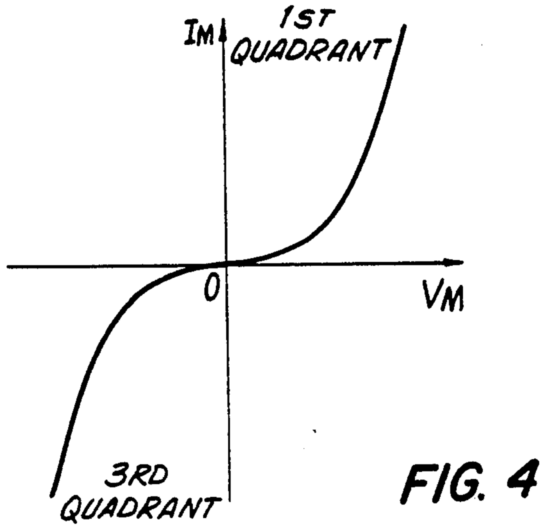
FIG. 4 is a graph showing the current-voltage characteristics of a MIM device of FIG. 2(B)

FIG. 1 is a timing diagram of waveforms for activating liquid crystal display panel 200 in accordance with an embodiment of the invention. Objects of an embodiment of the invention are achieved by activating panel 200 in accordance with this driving method.

Signal Yn for activating liquid crystal pixels intersecting column is the output from Y driver 202. A pattern that can be displayed by panel 200 by activating a liquid crystal pixel along column electrode n is shown in FIG. 6(A). Signals X2m and X2m+1 represent waveforms outputs from X driver 203 at row electrodes X2m and X2m+1. The effective voltage at a liquid crystal pixel is equal to the voltage supplied by the corresponding row electrode from X driver 203 subtracted from the voltage supplied to the corresponding column electrode from Y driver 202. Accordingly, signal Yn-X2m represents the waveform of voltage applied to pixel (2m, n). Pixel (2m, n) refers to the liquid crystal cell located at the intersection of row electrode 2m from X driver 203 and column electrode n from Y driver 202. Signal Yn-X2m+1 represents the waveform of voltage applied to pixel (2m+1, n).

Figure 3:
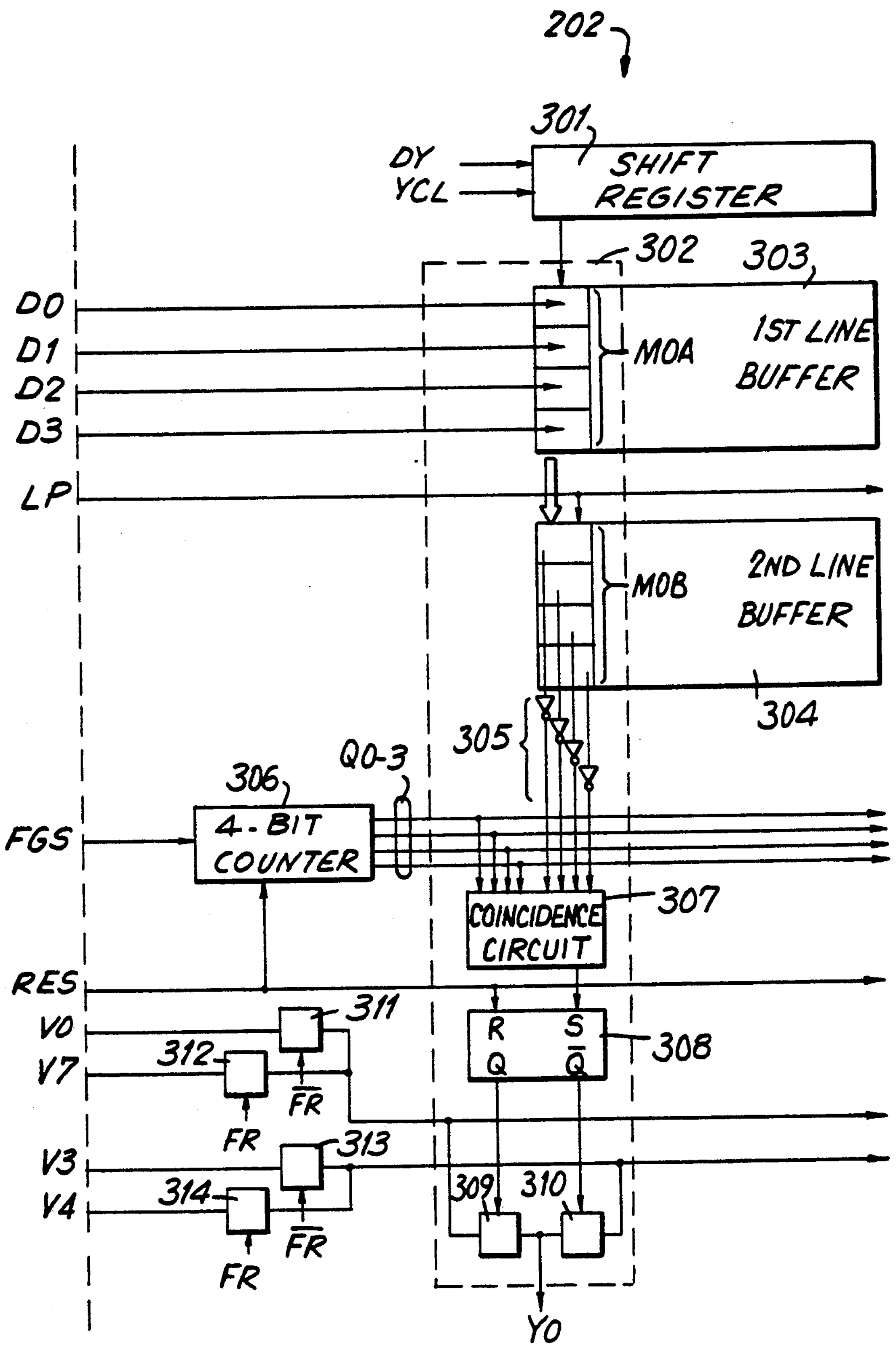
FIG. 3 is a circuit diagram of the Y driver of FIG. 2(A)

Y driver 202 is constructed as shown in FIG. 3 and is responsive to signals LP and RES. However, rather then being provided as the same signal, LP and RES are independent of each other. Two (2) RES pulses occur during one (1) LP period and are equivalent to 1 data output period. The period of signal FR is also equal to one data output period. Fifteen pulses from signal FGS occur during one (1) RES period. Signal FGS provides clock pulses to 4-bit counter 306 for grey levels. During one RES period, sixteen (16) different pulse width-modulated waveforms can be produced. Thus, the signal data output Yn from Y driver 202 is delivered twice, but with opposite polarities, as indicated at regions ⓐ and ⓑ during one data output period and based on the same video data.

Each row electrode receives a voltage sufficient to activate the liquid crystal pixel, sequentially, for interval Ts. The row electrode then remains at a voltage insufficient to activate the pixel for a period of Tn, until the next field.

Figure 5:
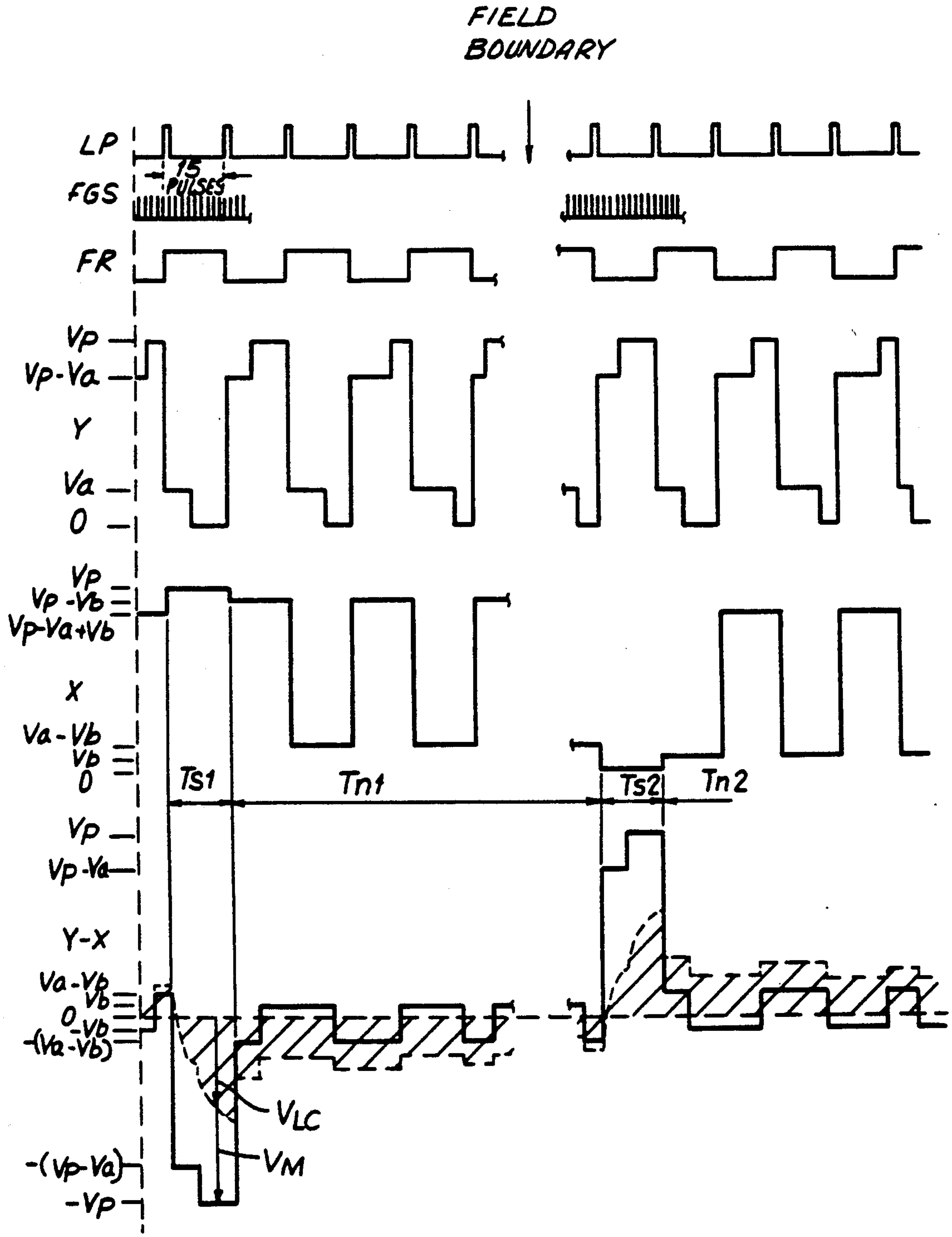
FIG. 5 PRIOR ART
FIG. 5 is a waveform timing diagram of signals for activating a liquid crystal cell.

During activation of liquid crystal display 200, a voltage is applied to liquid crystal material at pixel (2m, n) for example. The effective voltage at pixel (2m, n) is equal to the difference of the voltage of the row electrode from the voltage of the column electrode. This waveform is represented by the solid line of signal Yn-X2m. The waveform of the voltage applied across the liquid crystal material 207 (VLC) of pixel (2m, n) is indicated by the broken line shown on signal Yn-X2m. During selected period Ts, the pulse width-modulated output Yn increases by the magnitude of the potential across liquid crystal 207, which is represented by |VLC|. During unselected period Tn, Yn-X2m has a voltage of Va−Vb (Vb) or −Vb (−Va−Vb) and VM is small. Thus, electric charge is retained. The values of Va, Vb, etc. are shown in FIG. 5 and have been described above.

During period Tn, while rows 21, 21+1, 21+2 are selected sequentially, the voltage of Yn−Xzm (z is an integer) due to portion ⓐ, about row 21+1 for example, of output Yn that is pulse widthmodulated by the video data is Va−Vb. The voltage due to portion ⓑ is −Vb. In this manner, the voltage does not remain constant during a selecting period. The switch in voltages diminishes crosstalk. Consequently, the amount of electric charge discharged throughout the MIM device is not affected.

The same conditions occur with respect to pixel (2m+1, n). During unselected period Tn, rows 2l, 2l+1, 2l+2, etc. are selected sequentially. Waveform Yn−X2m+1, which is due to the waveform that is pulse width-modulated by the video data about these rows, takes levels (Va−Vb) (Vb) and −Vb (−Va−Vb), alternately. Because the voltage switches, crosstalk generated at the beginning of a data output period and during the switch cancel and crosstalk is thereby effectively controlled. Consequently, the amount of discharge throughout the MIM device is unaffected. Crosstalk is not developed between pixels (2m, n) and (2m+1, n) from the video data about the rows 2l, 2l+1, and 2l+2. In this manner, disadvantages caused by crosstalk between successive pixels in the same column can be prevented.

As described above, during one data output period, the output due to the same video data is delivered twice, but with opposite polarities, as shown in portions ⓐ and ⓑ of output Yn. The effects of the amount of discharge caused by the signals applied to each pixel during the unselected time, is cancelled out. Accordingly, crosstalk between successive display elements in the same column can be controlled by repeating the output of the same video data N times with each time including waveforms of opposite polarities and wherein N is a positive integer.

In the driving waveforms shown in FIG. 1, the selected period Ts is maintained at the same position of FR=0. Therefore, the voltages (indicated by hatching) applied to the liquid crystal for the successive rows, for example rows 2m and 2m+1, are in phase with each other. This causes the whole viewing side of the liquid crystal display to flicker at the frame frequency which can be 30 $H_z$, for example, creating an undesirable viewing quality.

Figure 8:
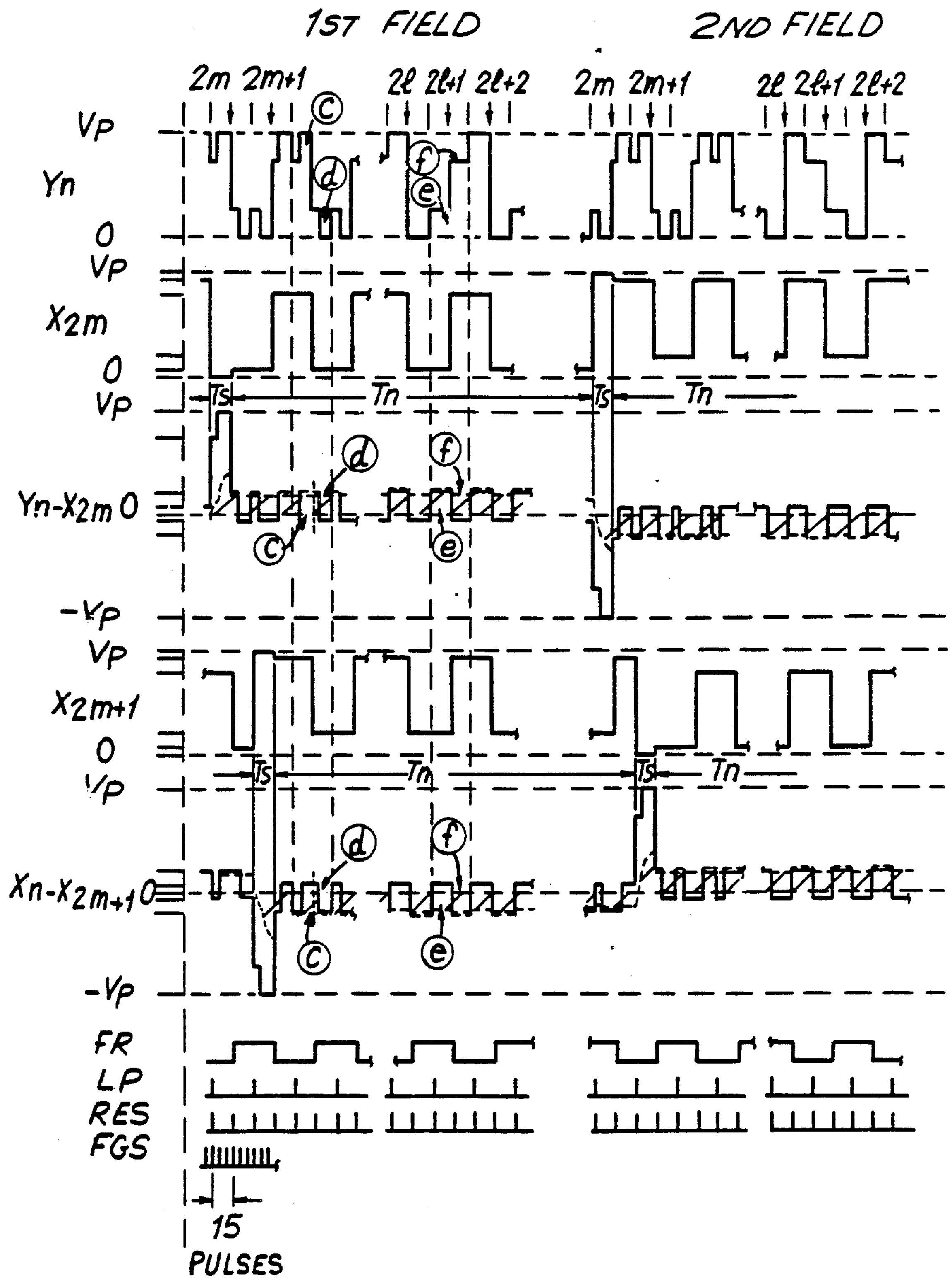
FIG. 8 is a waveform diagram of signals for activating a liquid crystal display element in accordance with the invention.

Another activation method in accordance with another embodiment of the invention is illustrated by the activating waveforms of FIG. 8, which can prevent problems associated with display flicker. The period of the FR signal is twice as long as one data output period. One FR signal is switched to the next FR signal at the middle point of one period of the LP signal. Thus, data is delivered with a different sequence of polarities in sequentially activated electrodes during successive data output periods.

For example, output Yn can be first delivered for the data about row 2m with positive polarity and then delivered with negative polarity during a data output period. When the data about row (2m +1) is delivered, the sequence of polarities is reversed. During each period in which data about each pixel is retained, the influence of the video data about other rows on the voltage waveforms (Yn−X2m) and (Yn−X2m+1), such as shown in areas ⓒ and ⓓ or ⓔ and ⓕ, are cancelled out, in the same way as in FIG. 1.

The effects from this activation method is that crosstalk between vertically adjacent pixels can be prevented. During selected period Ts for pixel (2m, n), FR=0. Selected period Ts for pixel (2m+1, 2n) occurs during FR=1. The voltage waveforms applied to the liquid crystal cells at these two pixels are 180° out of phase with each other. Consequently, the whole liquid crystal material of panel 200 is effectively activated with alternating current such that the phase of sequential rows is reversed. Hence, the flicker is greatly reduced.

As can be seen from the above description, in accordance with the invention, data are delivered N (integer) times with opposite polarities during a single data output period. During an unselected period, the video data about one pixel does not affect the video data about the other pixels of the same column and no crosstalk occurs. Where N=1, the sequence in which data of opposite polarities are delivered is thereby different between sequential data output periods. This significantly reduces flicker on the viewing side of the liquid crystal.

Accordingly, an improved display is achieved by a method of activating the matrix liquid display wherein a high voltage is applied to the electrodes of selected row electrodes and a low voltage is applied to unselected row electrodes. The method includes delivering the data signals about the selected rows and repeating this delivering step N times (N is a positive integer) with different polarities during one data output period. In one embodiment of the invention, N=1. The data signals about the selected rows may be delivered first with positive polarity and then with negative polarity during the first data output period of successive data output periods. In the second data output period, the data signals about the selected rows are delivered first with negative polarity and then with positive polarity.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of activating a liquid crystal display including row electrodes selectively supplied with scanning signals and column electrodes selectively supplied with data signals and liquid crystal material between the column and scanning electrodes to form liquid crystal picture element pixels defined at intersections between the row and column electrodes, comprising the steps of:

applying one activating voltage of activating magnitude to selected row electrodes for activating a liquid crystal picture element and then successively applying an activating voltage to successive row electrodes; and applying a data signal waveform to a column electrode and then inverting the waveform about a selected reference value, the waveform inverted N times (N is an integer) within one data output period so that the effective voltage at the picture element changes polarity N times during a data output period, said activating voltage corresponding to one of the data signal waveforms.

2. The method of claim 1, wherein the liquid crystal display is an active matrix display.

3. The method of claim 1, wherein a layer of liquid crystal material and a MIM device are electrically coupled, in series, between each intersection of a row electrode and a column electrode.

4. The method of claim 3, wherein the liquid crystal material is electrically coupled to the row electrode and the MIM is electrically coupled to the column electrode.

5. The method of claim 1, wherein a non-activating voltage is applied to the non-selected row electrodes during the data output period and the activating voltage applied to the selected row electrodes is of greater magnitude than the non-activating voltage applied to the other row electrodes.

6. The method of claim 5, wherein the data signal voltages and the scanning voltages are all non-negative voltages.

7. The method of claim 5, wherein the data signals and scanning signals are all non-positive voltages.

8. The method of claim 1, wherein the voltage applied to a row electrode during a data output period is initially of large magnitude and then switches to a voltage of lower magnitude.

9. The method of claim 1, wherein the voltage applied to the selected row electrodes during a data output period is initially a low magnitude voltage and then switches to a higher magnitude voltage.

10. The method of claim 8, wherein the voltage applied to the column electrodes inverts a plurality of times during a single data output period.

11. The method of claim 8, wherein the voltage applied to the column electrodes inverts one time (N=1) during a single data output period.

12. The method of claim 9, wherein the effective voltage applied to a picture element switches polarity a plurality of times during a data output period.

13. The method of claim 9, wherein the effective voltage applied to a picture element switches polarity one time (N=1) during a data output period.

14. The method of claim 1, wherein the voltage applied to a column electrode at the beginning of alternate data output periods is greater than the reference value and the voltage applied to the column electrode is less than the reference value at the beginning of the other data output periods.

15. The method of claim 14, wherein the liquid crystal display is an active matrix display.

16. The method of claim 14, wherein a layer of liquid crystal material and a MIM device are electrically coupled, in series, between each intersection of a row electrode and a column electrode.

17. The method of claim 16, wherein the liquid crystal material is electrically coupled to the row electrode and the MIM is electrically coupled to the column electrode.

18. The method of claim 14, wherein a non-activating voltage is applied to the non-selected row electrodes during the data output period and the activating voltage applied to the selected row electrodes is of greater magnitude than the non-activating voltage applied to the other row electrodes.

19. The method of claim 14, wherein the scanning signals are all non-negative voltages.

20. The method of claim 14, wherein the scanning signals are all non-positive voltages.

21. The method of claim 14, wherein the effective voltage applied to a picture element switches polarity a plurality of times during a data output period.

22. The method of claim 14, wherein the effective voltage applied to a picture element switches polarity one time (N=1) during a data output period.

23. The method of claim 16, wherein the voltage applied to the column electrodes inverts one time (N=1) during a data output period.

24. The method of claim 1, wherein the display is capable of producing multiple grey levels of display contrast and the data signals applied to the column electrodes during a data output period is a combination of activating magnitude voltage and non-activating voltage and the grey level of the picture element is determined by the ratio of the interval of activating magnitude voltage to non-activating magnitude voltage during the data output period.

25. The method of claim 14, wherein the display is capable of producing multiple grey levels of display contrast and the data signals applied to the column electrodes during a data output period is a combination of activating magnitude voltage and non-activating voltage and the grey level of the picture element is determined by the ratio of the interval of activating magnitude voltage to non-activating magnitude voltage during the data output period.

26. A method of activating a liquid crystal display including row electrodes and column electrodes with liquid crystal material therebetween and having picture elements at intersections between the row electrodes and column electrodes, comprising:

applying data signal voltages of activating magnitude to column electrodes corresponding to selected picture elements during a data output period for activating a picture element; and applying one activating scanning voltage of activating magnitude successively to successive row electrodes, said activating scanning voltage corresponding to one of said data signal voltages and applying a non-activating scanning voltage of non-activating magnitude to a row electrodes at other times, the voltage applied to the column electrodes inverting N times during a single data output period, where N is a positive integer, so that the effective voltage at the picture element changes polarity N times during a data output period.

27. The method of claim 26, wherein the signal voltage applied to the column electrodes switches from a first magnitude to a second magnitude N times during a signal data output period.

28. The method of claim 1, wherein the value of the voltage applied to the column electrodes can vary between 0 and a positive maximum voltage or between 0 and a negative maximum voltage, and the reference value is the mid-point voltage value between 0 and the positive maximum voltage or between 0 and the negative maximum voltage and the data signal voltage waveform applied to the column electrode inverts about the mid-point N times during a data output period, such that the value of the voltage applied to the column electrode crosses the mid-point voltage value and becomes the same magnitude of voltage from that mid-point value, for the same duration as before it crossed the mid-point, N times during a data output period.

29. The method of claim 1, wherein the voltage applied to a column electrode during one data output period includes a waveform including at least a first voltage followed by a second voltage of different magnitude and then waveform including the first and second voltages is inverted N times, said waveform applied and inverted N times during one data output period.

30. The method of claim 1, wherein the voltage waveform applied to a column electrode during a data output period is an inversion of the voltage waveform applied to the column electrodes during the next data output period.

31. The method of claim 1, wherein the value of the voltage applied to a column electrodes at the start of alternating data output periods is at the opposite side of the reference value compared to the voltage applied at the beginning of the other data output periods.

32. The method of claim 28, wherein the value of the voltage applied to a column electrodes at the beginning of alternating data output periods is at the opposite side of the midpoint compared to the voltage applied at the beginning of the other data output periods.

33. The method of claim 1 wherein the data output period is equal to 2N times the duration of the activating voltage.

34. The method of claim 26 wherein the data output period is equal to 2N times the duration of the activating voltage.

35. The method of claim 26, wherein a non-activating voltage is applied to the non-selected row electrodes during the data output period and the activating voltage applied to the selected row electrodes is of greater magnitude than the non-activating voltage applied to the other row electrodes.

36. The method of claim 26, wherein the data signal voltage and scanning voltage are all of non-negative voltage and non-positive voltage.

37. The method of claim 26, wherein the voltage applied to the column electrodes inverts a plurality of times during a single data output period.

38. The method of claim 26, wherein the voltage applied to the column electrodes inverts one time (N=1) during a single data output period.

39. The method of claim 26, wherein the display is capable of producing multiple grey levels of display contrast and the data signals applied to the column electrodes during a data output period is a combination of activating magnitude voltage and non-activating voltage and the grey level of the picture element is determined by the ratio of the interval of activating magnitude voltage to non-activating magnitude voltage during the data output period.

40. The method of claim 26, wherein the value of the voltage applied to the column electrodes can vary between 0 and a positive maximum voltage or between 0 and a negative maximum voltage, and a reference value is the mid-point voltage value between 0 and the positive maximum voltage or between 0 and the negative maximum voltage and the data signal voltage waveform applied to the column electrode inverts about the midpoint N times during a data output period, such that the value of the voltage applied to the column electrode crosses the mid-point voltage value and becomes the same magnitude of voltage from that mid-point value, for the same duration as before it crossed the mid-point, N times during a data output period.

41. The method of claim 26, wherein the voltage applied to a column electrode during one data output period includes a waveform including at least a first voltage followed by a second voltage of different magnitude and then waveform including the first and second voltages is inverted N times, said waveform applied and inverted N times during one data output period.

42. The method of claim 40, wherein the value of the voltage applied to a column electrode at the start of alternating data output periods is at the opposite side of the reference value compared to the voltage applied at the beginning of the other data output periods.

43. The method of claim 26, wherein the liquid crystal display is an active matrix display and a layer of liquid crystal material and an active element are coupled in series between each intersection of a row electrode and a column electrode.

* * * * *